US009066366B2

(12) United States Patent
Nádas et al.

(10) Patent No.: US 9,066,366 B2
(45) Date of Patent: Jun. 23, 2015

(54) METHOD AND A SYSTEM FOR DOWN LINK CONTROL IN A CELLULAR TELEPHONY SYSTEM

(75) Inventors: Szilveszter Nádas, Budapest (HU); Peter Lundh, Skärholmen (SE); Sándor Rácz, Cegléd (HU); Zoltán Nagy, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1382 days.

(21) Appl. No.: 12/516,237

(22) PCT Filed: Nov. 28, 2006

(86) PCT No.: PCT/SE2006/050509
§ 371 (c)(1),
(2), (4) Date: May 26, 2009

(87) PCT Pub. No.: WO2008/066428
PCT Pub. Date: Jun. 5, 2008

(65) Prior Publication Data
US 2010/0062777 A1  Mar. 11, 2010

(51) Int. Cl.
*H04L 12/26* (2006.01)
*H04W 72/00* (2009.01)
(Continued)

(52) U.S. Cl.
CPC ........... *H04W 72/1252* (2013.01); *H04L 47/10* (2013.01); *H04L 47/11* (2013.01); *H04L 47/12* (2013.01); *H04L 47/125* (2013.01); *H04L 47/14* (2013.01)

(58) Field of Classification Search
USPC ............... 455/1, 67.11, 422.1, 450–453, 561; 370/229–238, 329, 412; 709/232–235
See application file for complete search history.

(56) References Cited

U.S. PATENT DOCUMENTS 5,649,299 A * 7/1997 Battin et al. .................... 455/62
6,728,217 B1 * 4/2004 Amirijoo et al. .............. 370/252
(Continued)

FOREIGN PATENT DOCUMENTS

EP  1331768 A1  7/2003
EP  1672845 A1  6/2006
(Continued)

OTHER PUBLICATIONS

Szilveszler et al., "Providing congestion control in the Iub Transport Network for HSDPA", Global Telecommunications Conference, 20007, IEEE GLOBECOM 2007, Piscataway, NJ, US, Nov. 1, 2007, pp. 5293-5297.
(Continued)

*Primary Examiner* — Michael Mapa
(74) *Attorney, Agent, or Firm* — Coats & Bennett, PLLC

(57) ABSTRACT

A method for traffic control in a cellular telephony system (100), each cell comprising at least one node, an RBS (130), for the control of traffic to and from users (150) in the cell. The traffic to each UE (150) can comprise at least one flow, and the method is intended for control of the flows in the traffic to UEs (150) in the system (100), and comprises one control function for each controlled flow to each of said UEs (150). Said control function comprises a congestion avoidance function (240, 440) which detects the presence or absence of congestion in a flow to an UE (150), and which, upon congestion or low utilization of the network reduces the bit rate to the UE (150) in a non-linear fashion, and which, in the absence of congestion, linearly increases the bit rate of the traffic to the UE (150).

22 Claims, 6 Drawing Sheets

(51) Int. Cl.
  *G06F 15/16* (2006.01)
  *H04W 72/12* (2009.01)
  *H04L 12/801* (2013.01)
  *H04L 12/803* (2013.01)

(56) References Cited

U.S. PATENT DOCUMENTS

| | | | |
|---|---|---|---|
| 6,889,050 B1* | 5/2005 | Willars et al. | 455/452.2 |
| 7,756,082 B1* | 7/2010 | Dhamdhere | 370/331 |
| 2002/0150048 A1* | 10/2002 | Ha et al. | 370/231 |
| 2003/0026207 A1 | 2/2003 | Loguinov | |
| 2003/0092392 A1* | 5/2003 | Komandur et al. | 455/67.1 |
| 2003/0189934 A1 | 10/2003 | Jeffries et al. | |
| 2007/0082675 A1* | 4/2007 | Gruet et al. | 455/453 |
| 2009/0005053 A1* | 1/2009 | Agin et al. | 455/450 |
| 2010/0035619 A1* | 2/2010 | Panico et al. | 455/446 |

FOREIGN PATENT DOCUMENTS

| | | |
|---|---|---|
| GB | 2372406 A | 8/2002 |
| WO | 01/97446 A2 | 12/2001 |
| WO | 02/25969 A1 | 3/2002 |
| WO | 02/052886 A1 | 7/2002 |
| WO | 2007064292 A1 | 6/2007 |

OTHER PUBLICATIONS

Necker, et al., "Impact of Iub Flow Control on HSDPA System Performance", 2055 IEEE 16th International Symposium on Personal, Indoor and Mobile Radio Communications, Berlin, Germany, Sep. 11, 2055, vol. 3, pp. 1703-1707.

Siemens, "E-DCH TNL Congestion Control with Soft Handover", 3GPP TSG-RAN Working Group 3 meeting #51, R3-060266, Denver, USA, Feb. 9, 2006.

Bajzik et al., "Cross-Layer Backpressure to Improve HSDPA Performance", The 17th Annual IEEE International Symposium on Personal, Indoor and Mobile Radio Communications (PIMRC'06), Sep. 1, 2006, pp. 1-5.

Necker, "Parameter Selection for HSDPA Iub Flow Control", Wireless Communication Systems, 2005, 2nd International Symposium on Siena, Italy, Sep. 5, 2005, pp. 233-237.

* cited by examiner

METHOD AND A SYSTEM FOR DOWN LINK CONTROL IN A CELLULAR TELEPHONY SYSTEM

TECHNICAL FIELD

The present invention discloses a method for traffic control in a cellular telephony system, and is intended for control of the traffic to users in the system.

BACKGROUND

In systems for Wideband Code Division Multiplex Access (WCDMA), the traffic to a user in the system, i.e. a cellular telephony subscriber, can comprise one or more so called flows. The traffic to a subscriber can use channels referred to by the term HSDPA, High Speed Data Packet Access, while the traffic from the subscriber can use channels known as HSUPA, High Speed Uplink Packet Access, also known as EUL, Enhanced Uplink.

In order to avoid congestion in the system, the system should comprise some form of function for flow control in the HSDPA, and preferably also in the EUL. The main purpose of such functions is to adapt the traffic rate on the HSDPA and/or the EUL to suitable bit rates. The present invention is mainly directed towards flow control in the HSDPA.

Flow control of HSDPA as such is known, but known algorithms are, to a great extent, based on aggregated schemes. Such algorithms have a number of drawbacks, among which the following can be mentioned:
- when high speed flows encounter different bottlenecks over the transport network, the performance of the aggregate flow-control can be degraded,
- the different scheduling policies can not be made independent from the flow control behaviour to the extent which would be desirable,
- aggregated flow control can be sensitive to functionality changes in the system.

SUMMARY

There is thus a need for a method for HSDPA control which would overcome the disadvantages of the previously known such methods and systems, as explained above.

This need is addressed by the present invention in that it discloses a method for traffic control in a cellular telephony system, which system comprises a number of cells, each cell comprising at least one node, a Radio Base Station (RBS), for the control and routing of traffic to and from users (from now on referred to as User Equipments, UE) in the cell. The traffic to each UE can comprise at least one flow The method of the invention is intended for control of the flows in the traffic to the UE:s in the system, and comprises one control function for each controlled flow to each of said UE:s.

The control function comprises a congestion avoidance function which detects the presence or absence of congestion in a flow to an UE, and which, upon detection of congestion or low utilization of the network, reduces the bit rate of the traffic to the congested UE in a non-linear fashion. In the absence of congestion, the control function linearly increases the bit rate of the traffic to the previously congested UE.

Since the invention offers one flow control function per controlled flow to each UE, the control can be more sensitive to variations in the flow which it controls, in addition to which "links" in the control of different flows are avoided. Also, system changes will affect the control function of the invention to a lesser extent than previous control functions.

It should be pointed out that all flows to a UE may not be controlled by a flow control function of the invention, depending on the specific application. Thus, the term "flow controlled flows" has been used above, to indicate this fact.

The exact mechanisms of the method of the invention will be described in more detail in the following, so that the advantages which are gained by means of the invention will also be appreciated to a greater extent.

However, in one embodiment of the invention, the non-linear reduction of the bit rate mentioned above may be carried out in an exponential fashion. In another embodiment, it may be carried out, for example, as a step function.

Also, the congestion avoidance function may, in a particular embodiment, include a "down prohibit" function, which guarantees a minimum time between bit rate decreases.

Preferably, the invention is applied to a cellular system of the WCDMA type.

The invention also discloses a Radio Base Station with functions which are similar to the method of the invention.

BRIEF DESCRIPTION OF THE DRAWINGS

The invention will be described in more detail in the following, with reference to the appended drawings, in which.

DETAILED DESCRIPTION

As described above, the invention discloses a method and a corresponding system for control of HSDPA flows. In a preferred embodiment, the invention will be applied to a cellular telephony system of the WCDMA type, for which reason the invention will in the following be described as belonging in such a system.

In order to facilitate the understanding of the further detailed description given below, the terminology which will be used will first be explained, with reference to FIG. 1 which shows a schematic overview of a system 100 in which the invention may be applied.

RNC: Radio Network Controller, 110, a function which is responsible for the control of the radio resources in the system.

RBS: Radio Base Station, 130. The RBS carries out the control of traffic to and from User Equipments, 150, and routs traffic to and from those users. Sometimes referred to as "node B" in WCDMA systems.

UE: User Equipment, 150, i.e. the equipment of a user in the system, for example a cellular telephone, a laptop computer equipped with a SIM-card and corresponding equipment, etc. Sometimes also referred to as the MS, Mobile Station.

Iub interface, 120: the interface between the RNC 110 and the RBS 130.

Uu interface, 140: the interface between the RBS 130 and the UE 150.

As has been explained above, one of the purposes of the invention is to avoid congestion in the system, for example on the so called Transport Network, TN, which is located between the RNC 110 and the RBS 130.

Figure 1:
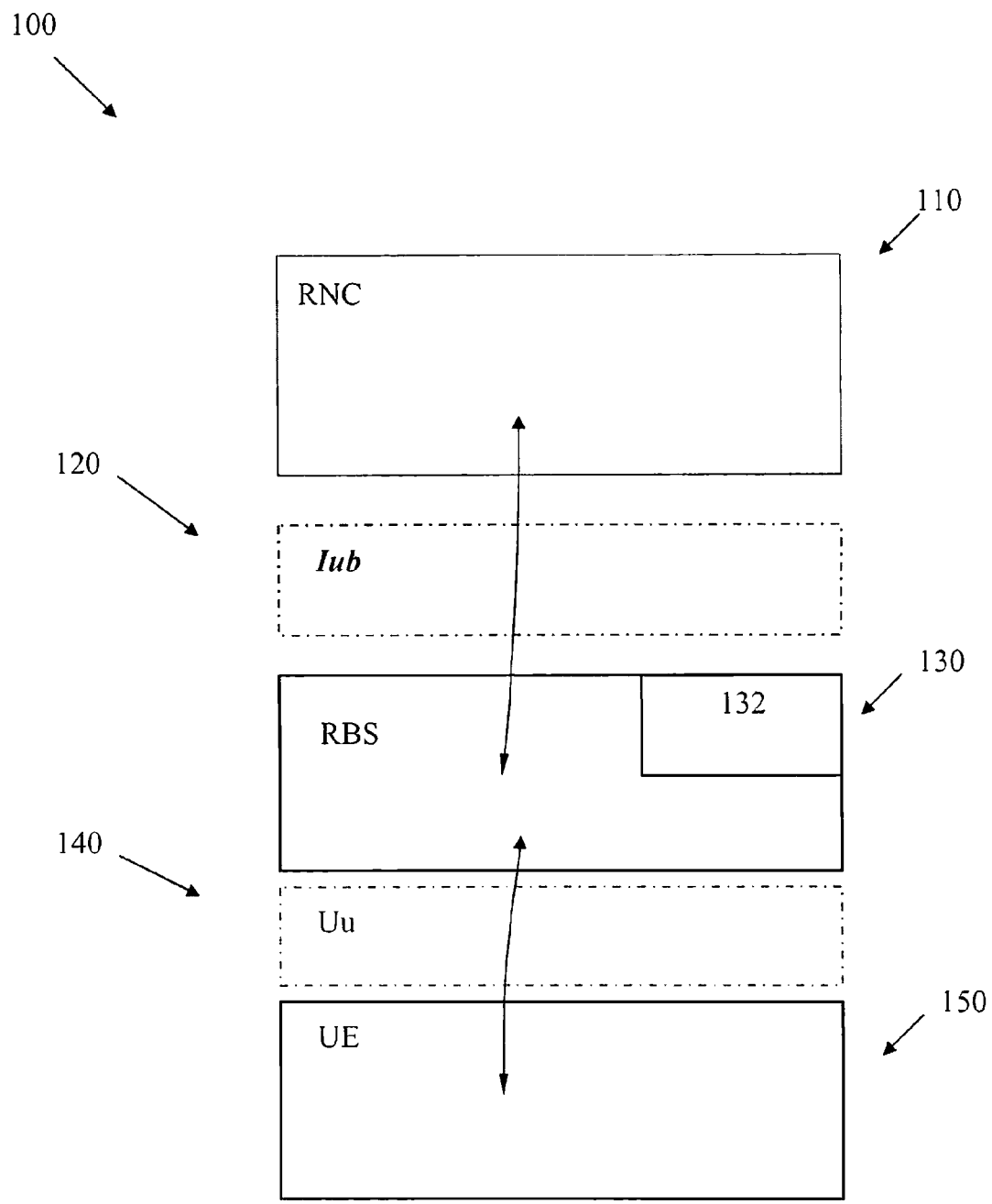
FIG. 1 shows a schematic overview of a system in which the invention may be applied.

The flow control function of the invention is suitably located in the RBS 130, and is therefore schematically indicated in FIG. 1 as 132 in the RBS 130.

A principle behind the algorithm used by the invention will now be described, first briefly, and then in more detail: congestion information and data measurements are used as input to the algorithm, while the output of the algorithm is used to define the amount of traffic allowed on the downlink, in this case by means of the algorithm outputting the so called Capacity Allocation (CA) control frame to the RNC 110 in question, sometimes referred to as the SRNC, Serving RNC.

Data frames are then generated in the RNC 110 according to the received Capacity Allocation Bit Rate and sent over the Transport Network to the RBS 130. On reception of such data frames, the RBS 130 executes a congestion check of the Iub, and the data is then scheduled for transmission to the UE 150, in a WCDMA system via a so called Priority Queue, PQ.

An important issue in this context is that if a decreased Capacity Allocation Bit Rate is sent to the RNC 110, there will be a delay before the system is able to react to this, due to a number of various delays in the system. This is an issue which is also addressed by the present invention.

The flow control method of the invention can be divided into four main steps or states, as indicated below and in the chart 200 shown in FIG. 2. It should be pointed out here that the arrows which connect the blocks in FIG. 2 are not intended to show the only connections or flows between the states of the invention, but are merely indicative of some of the connections and flows between the states.

Figure 2:
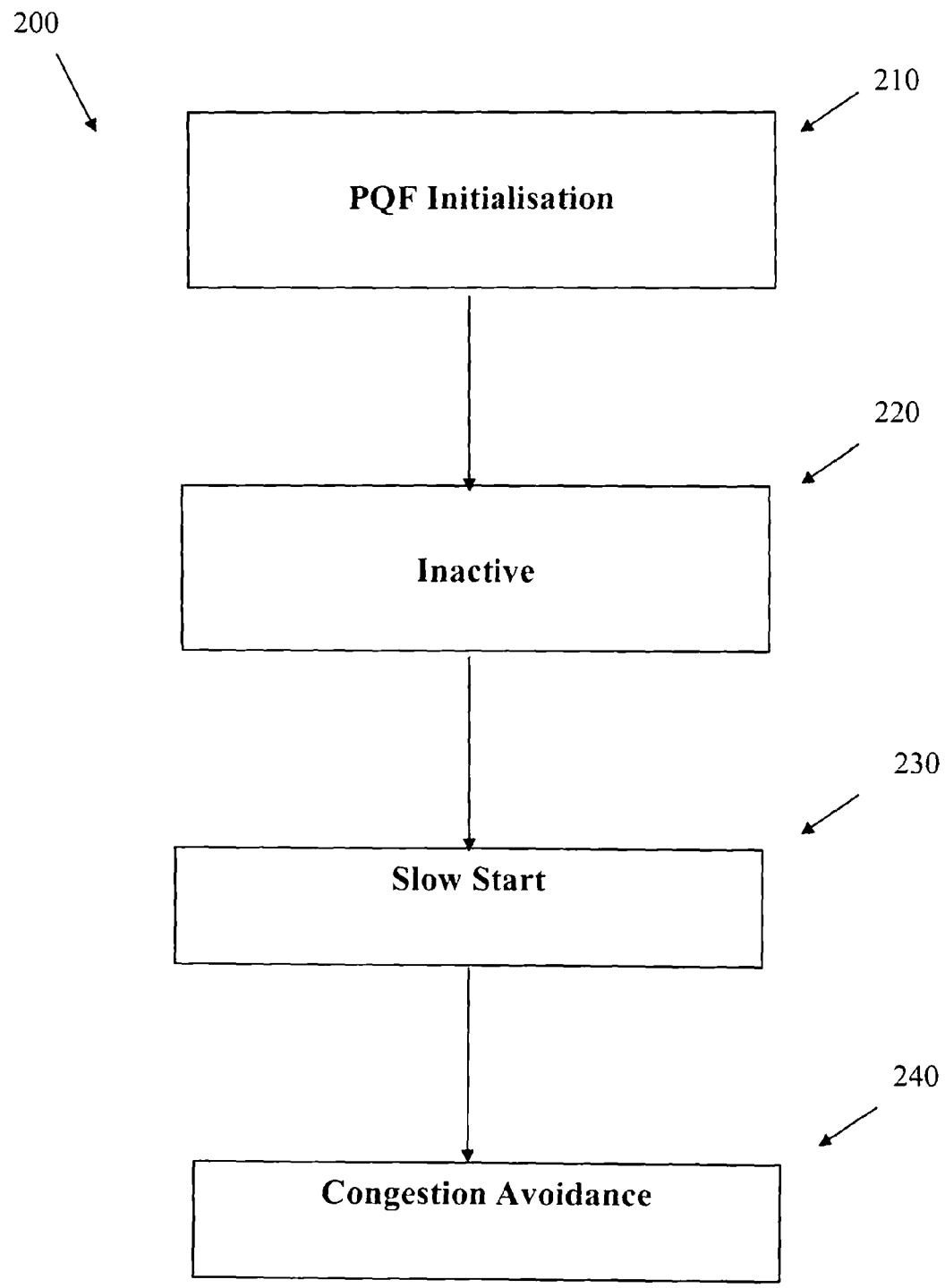
FIG. 2 shows a flow chart with an overview of some major functions of the invention.

As shown in FIG. 2, the method of the invention comprises a so called "PQF-initialisation" state, shown as block 210 in FIG. 2. In this state, the method sets up some basic parameters for the flow, including the maximum bit rate for the flow (referred to as hsMaxPqRate), the initial bit rate of the flow (referred to as hsInitialCaCredit) and the threshold (referred to as hsSsTresh) for the "Slow start" state, a state which will be explained below.

From the PQF initialisation state, the flow control proceeds to the "Inactive" state, shown as 220 in FIG. 2. The flow control is in this state until it receives a data packet with UBS>0.

When the flow control is in the Inactive state and receives a data packet with UBS>0, it proceeds to the state referred to as "Slow start", shown as 230 in FIG. 2. In this state, "Slow start", the bit rate is allowed to increase rapidly, preferably in a non-linear fashion, suitably in an exponential fashion. The bit rate is increased until the threshold defined in the Initialisation phase is reached, or until congestion is reached. If either of those two conditions is fulfilled, the flow control proceeds to the state of Congestion Avoidance.

Figure 3:
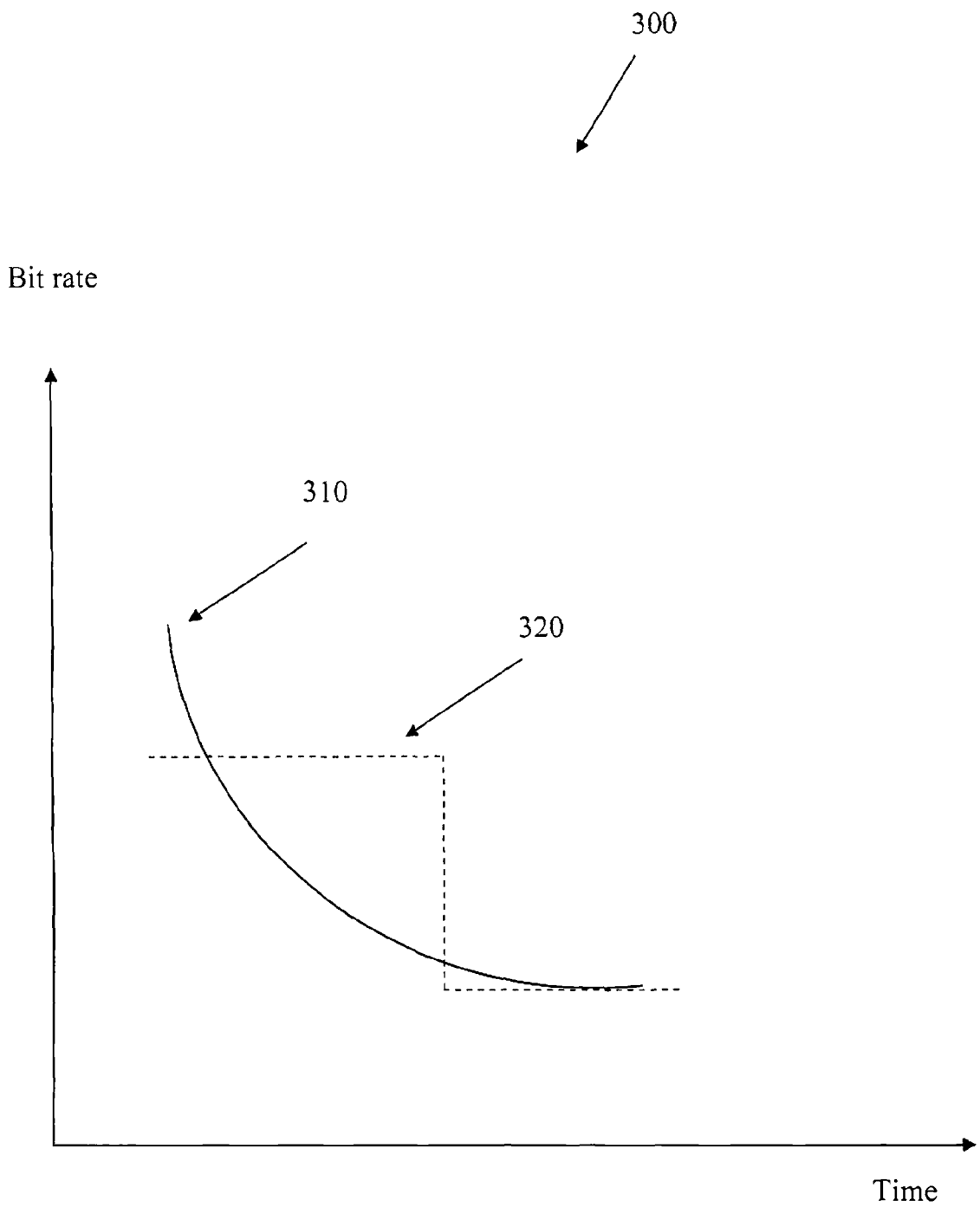
FIG. 3 shows functions which may be used for bit rate decrease.

Congestion avoidance is shown as 240 in FIG. 2, and in this state the bit rate is increased only linearly when there is no congestion, but decreased non-linearly, suitably exponentially, in the case of congestion. Naturally, the decrease can also be linear if that is more suitably for the system or application in question. In another embodiment, the decrease can be carried out as a step function. FIG. 3 shows a diagram 300 of two of these possibilities, an exponential decrease is shown with a full line and indicated as 310, and a step function is shown with dashed lines, and is indicated as 320.

In the Congestion Avoidance state, there is a function which is included in order to guarantee a minimum distance in time between bit rate decreases. In a preferred embodiment, this function is performed by means of a timer, referred to as the "Down prohibit timer". The timer is activated after each bit rate decrease, and if the timer is active no new decrease is carried out.

The method of the invention will now be explained in more detail in the following, with reference to the flowchart 400 in FIG. 4a. In the flowchart 400, each of the steps or states of FIG. 2 is explained in more detail, with the function of block 410 of FIG. 4a corresponding to the function of block 210 of FIG. 2, block 420 corresponding to block 220, block 430 to block 230, and block 420 to block 220.

PQF Initialisation, Block 410

When a new flow controlled HSDPA flow is to be established, the maximum bit rate (hsMaxPqRate) of the flow is calculated, suitably based on radio scheduler and Iub information, and will serve as the maximum achievable bit rate of the flow. Following this, an initial Capacity Allocation control frame, CA, is sent to the RNC. The threshold for the "Slow start" state, (hsSSTresh) is set to the maximum achievable bit rate of the flow (hsMaxPqRate) and the flow control state is changed to the Inactive state, which will be described below.

Inactive State, Block 420

During the Inactive state, the flow control at regular intervals, such as, for example, every second, sends a CA CF (Control Frame) specifying inactive-CArate to the RNC 110. This is repeated until the flow control receives a correct HS-DSCH Iub data frame with non-zero UBS field. (HS-DSCH: High Speed Downlink Shared Channel.)

When a HS-DSCH Iub data frame with non-zero UBS field is received, the flow control calculates the hsSsStartPoint, which will be the initial caBitrate. The flow control can also, at this stage, reset some counters and timers, such as hsRecPduOctets, which is the aggregated number of received octets. This is, however, not shown in FIG. 4, for reasons of clarity.

Finally, the flow control state is changed to the Slow Start state, which will be described below.

The Slow Start Stage, Block 430.

When the flow control state proceeds to the Slow Start state, it sends a CA message which contains the hsSsStartPoint to the RNC 110. The flow control is then synchronized to a timer $t_1$, for example a 100 ms timer tick, and will work only at the frequency of that timer, which in the example given will then be every 100 ms.

The flow control collects the input data (such as, for example, congestion flags, amount of incoming octets, etc.) and checks whether congestion occurred during the last timer (100 ms) interval.

If congestion occurred during the last timer interval, the flow control state is changed to Congestion Avoidance. If not, a check is carried out to see if the caBitrate can be increased. Suitably, in such a step, the flow control ensures that the latest sent increase in bit rate has already stabilized in the system. A method for doing this will be described later in this text.

If an increase in caBitrate is allowed, the flow control increases the caBitrate exponentially (for example, by doubling the caBitrate), and takes into account the hsMaxPqRate, and also resets the incoming octet counter (hsRecPduOctets) congestion flags.

If the new caBitrate is higher than the hsSSTresh, then flow control sets back the caBitrate to this upper limit (i.e., hsSSTresh) and sends this new CA message if the caBitrate is different compared to the previous one.

Finally, the flow control state is changed to Congestion Avoidance. If the new caBitrate is lower than the hsSSTresh, the flow control simply sends the new caBitrate (if needed, namely the previous one is different or it sent more than 1 second ago) and waits for the next tie interval (100 ms in this example) tick.

If an increase in caBitrate is not allowed, the caBitrate isn't changed and CA CF is sent only if necessary, i.e. if it wasn't sent in the last 1 s. The flow control then waits for the 100 ms tick, and functions as described above.

Figure 4A:
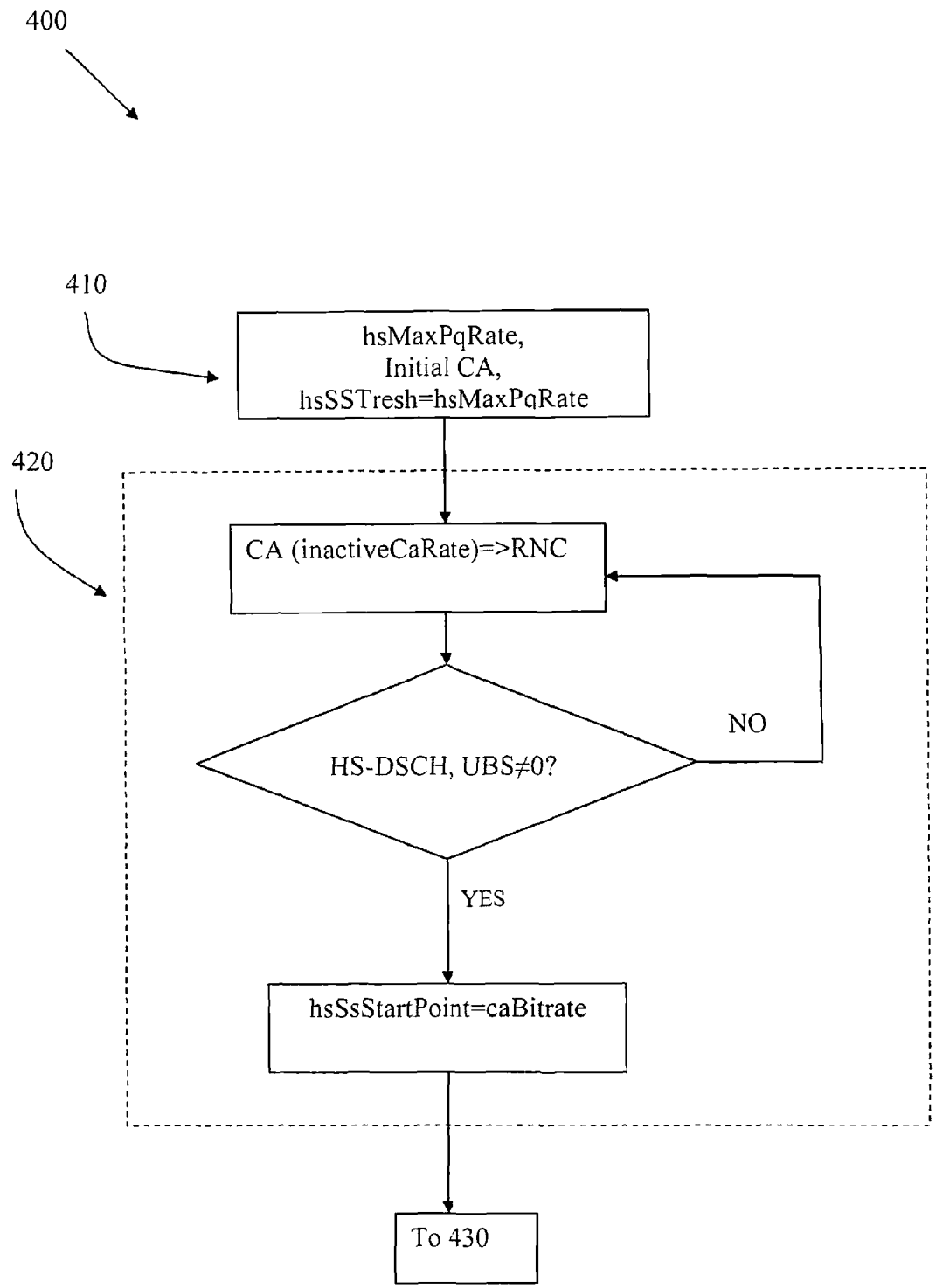
FIG. 4a-4c shows a flow chart which outlines some major steps of the invention.
Figure 4B:
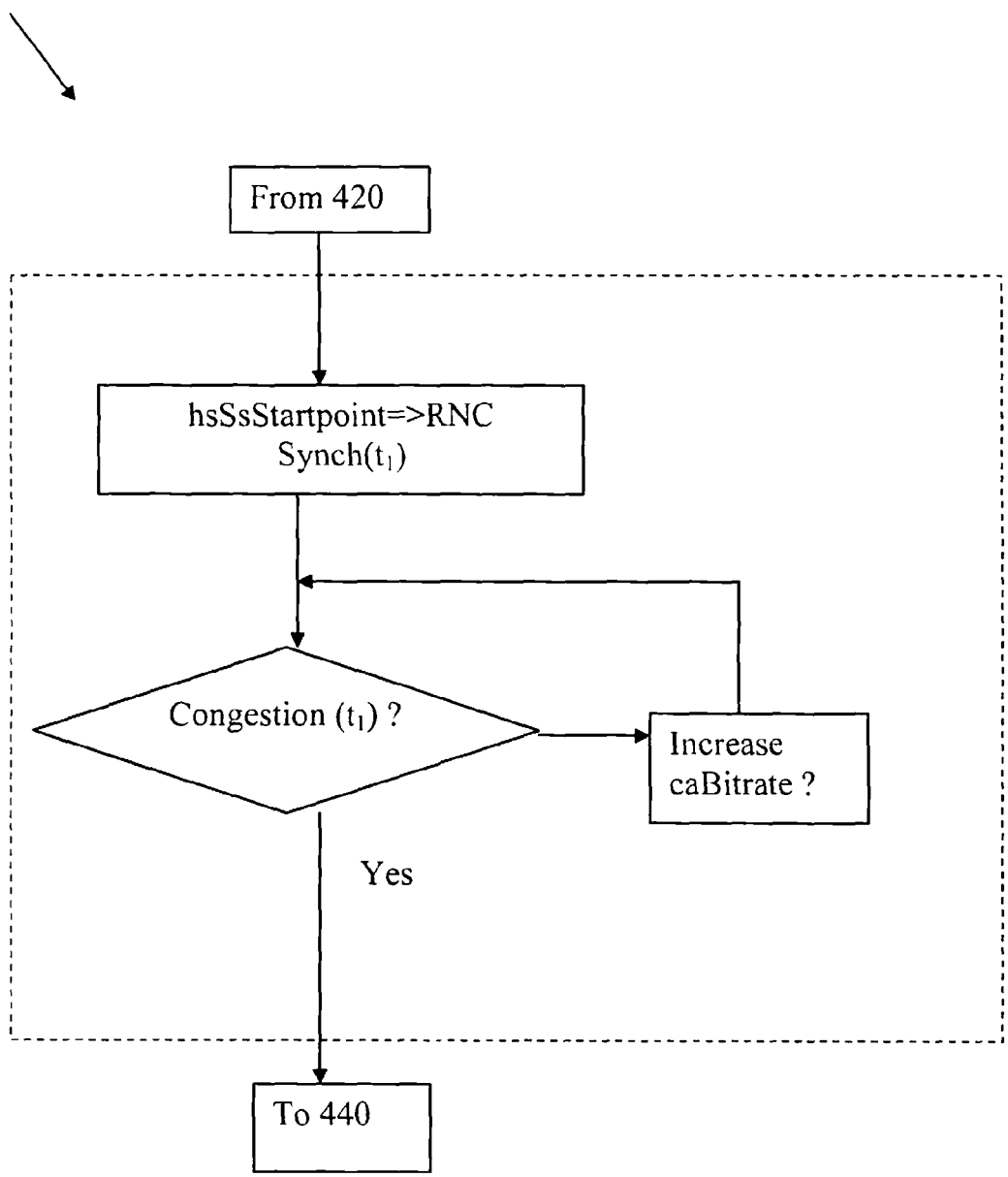

In block 430 in FIG. 4b, for reasons of clarity, not all of the steps described above are shown.

Figure 4C:
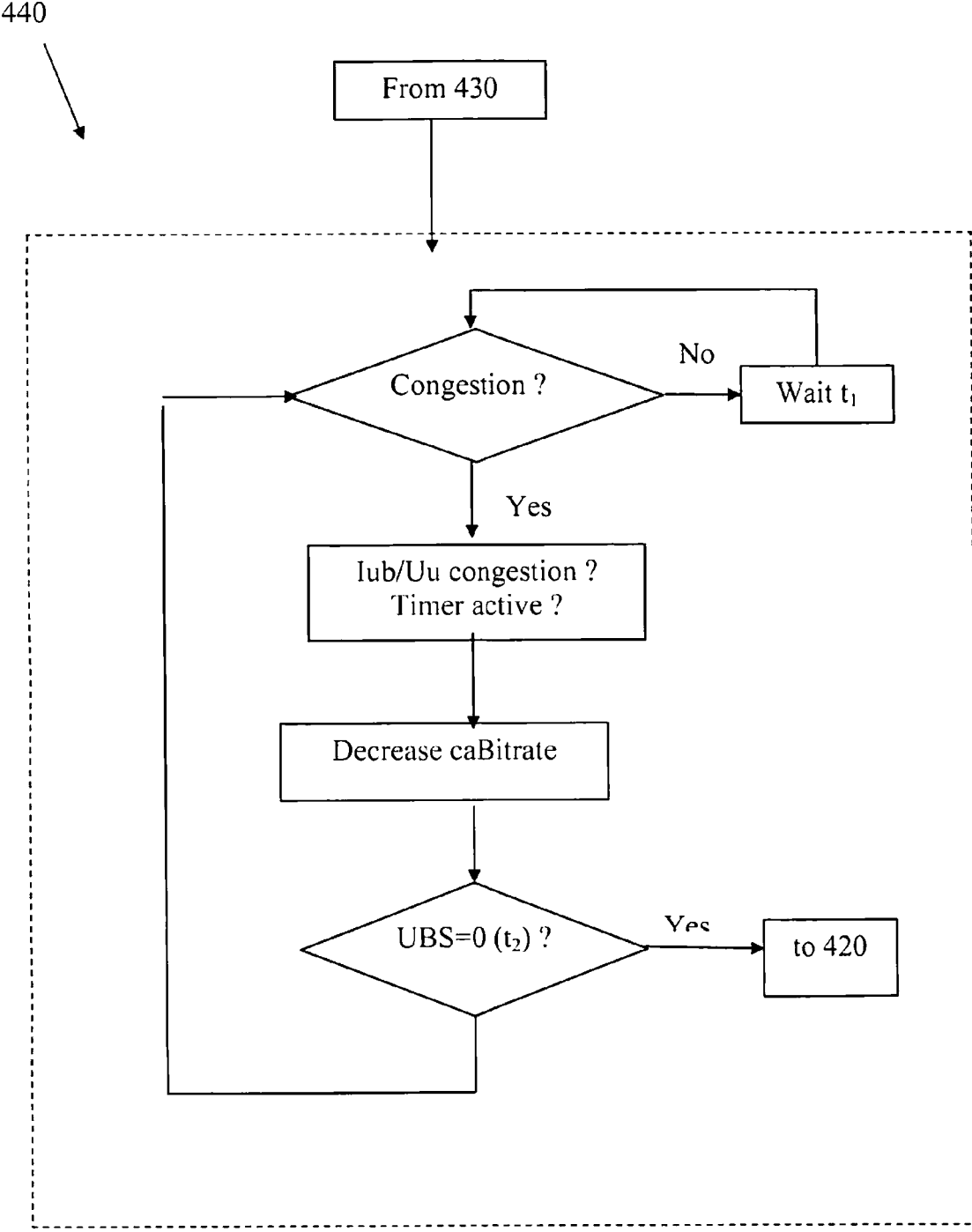

The Congestion Avoidance State, Block 440, FIG. 4c

Before a description is given of the congestion avoidance state 440, it should be stated that in similarity with block 430, in block 440 not all of the steps which will be described below are shown, for reasons of clarity.

If the flow control state is changed to Congestion Avoidance, this can be caused by one of two reasons: the caBitrate has reached the hsSSTresh, or congestion has occurred.

If the caBitrate reached the hsSSTresh, the flow control simply waits for the next 100 ms tick.

If congestion occurred during the last 100 ms interval, the flow control determines the rate of the caBitrate decrease (CurDownStep) based on the type of congestion. In the case of Uu congestion, the rate of the decrease is based on the actual value of the PqtCoeff (a coefficient which will be explained in more detail below), Uu being the interface 140 between the RBS 130 and the UE 150, while the decrease rate is set to 50% in the case of Iub congestion, Iub being the interface 120 between the RNC 110 and the RBS 130. If the occurrence of more than one congestion is observed, the biggest decrease rate will be taken into account.

The flow control method of the invention also checks if the Down Prohibit timer is active or not. If the timer isn't active, the flow control function decreases the caBitrate by CurDownStep. If the timer is active, the flow control compares the last decrease rate to the CurDownStep, and if the CurDownStep is the higher (suitably also taking into account a predefined margin) of the two, the flow control function decreases the caBitrate by CurDownStep and the previous decrease rate. It should be pointed out that this adjustment can only happen if the Down Prohibit timer is active. If CurDownStep is lower than the last decrease rate, the caBitrate is not decreased by the flow control.

If the caBitrate is decreased, the flow control resets counters, congestion flags and timers, such as the Down Prohibit timer. If needed, the flow control then sends the new CA message to RNC. The flow control then waits for the next 100 ms tick, collects the inputs, and checks the congestion flags.

If congestions occurred, the flow control works as described above. If not, it increases the rate, preferably in a linear fashion, with a suitable value being e.g. 40 kbps/sec.

There is only one possibility of leaving leave the Congestion Avoidance state: if the UBS field of the incoming HS-DSCH Iub data frames are equal to zero during a predefined (long) period of time $t_2$, for example 10 seconds. If this is the case, the flow control changes its state to the Inactive state and an inactiveCaRate will be sent to the RNC by the flow control.

PQT and pqtCoeff Calculation

Above, the coefficient pqtCoeff was used in conjunction with uu congestion and the rate of data decrease. This coefficient will now be explained, with the use of another coefficient referred to as PQT.

The PQT is estimated by the flow control based on the Priority Queue Length (PQL). Two additional fields are introduced in the PDUs: a timestamp which contains the time when the PDU arrived to the RBS (timeStamp) and the PQL at that time (pqlStamp).

When the flow control collects these inputs, for example once every 100 ms, it takes these values from the first PDU in the PQ (if there is any, otherwise PQT will be zero) and estimates linearly with the current value of the PQL, according to the following equation:

$$PQT = \frac{presentPql}{pqlStamp} * (presentTime - timeStamp).$$

The pqtCoeff is a coefficient between 0.5 and 1.0, which is calculated directly from the PQT. If the PQT is too small, the pqtCoeff will be high, around 1, but if the PQT is high, then the pqtCoeff will be close to 0.5. The flow control detects Uu congestion if the pqtCoeff less than 1.

As has been mentioned previously, one of the features of the invention is that it detects congestion in the system, and acts upon it. Congestion can be detected in a number of ways, for example by the use of congestion flags etc, but in the following, one way of congestion detection which can be used by the present invention will be described, together with a remedy for congestion.

HSDPA uses the best effort type of transport bearers over the WCDMA transport network. CAPACITY ALLOCATION, CA, control frames are used for indicating congestion, but these frames must be forwarded all the way to the receiver in order to obtain a reduced bit rate. If the network is congested, there is a risk that these control frames will never reach the destination. The receiver is in this case the RNC, Radio Network Controller, and the CA frames are sent from the RBS to the RNC.

According to the present invention, the problem of congestion stopping CA frames can be solved by checking if the CA frames reach their destination at certain predefined intervals, for example at least one CA frame per flow per 3 seconds. If this does not happen, the bit rate will be reduced until the CA frames start to reach their destination. The bit rate is suitably reduced in predefined steps.

Naturally, the data frame whose arrival at its destination is checked in order to detect congestion can be of another kind of data frame, the CA frame is merely an example of a suitable data frame which can be used.

This approach will solve the problem mentioned, and will also offer a number of advantages:

The system will react properly to the loss of control frames.
The system will handle congestion properly.
The normal operation of the system is not disturbed.
Only a small amount of additional signalling traffic is required, i.e. extra control frames.

The principle suggested here for congestion detection and its remedy has been described in a down-link application (HSDPA) only, but it can be pointed out here that the same general approach can be used in up-link applications. Up-link is referred to as HSUPA (High Speed Uplink Packet Access) or EUL (enhanced Uplink), and a suitable kind of data frame to use in up-link applications would be the TCI, Transport Network Layer Congestion Indication.

As has been mentioned previously, the HSDPA bit rate can be increased if there is no congestion, and decreased if there is congestion or low utilization of the network. Detection of these conditions, i.e. congestion/no congestion, or low utilization of the network, can be carried out in a number of ways, but in the following, a preferred algorithm for the detection of these conditions will be described.

Using the preferred algorithm, the per-flow HSDPA flow control counts the amount of data, expressed for example as octets, received by the RBS 130 since the Capacity Allocation CF (CA CF) was last changed.

If the amount of data received octets is higher than the rate of the last sent CA CF multiplied by a time constant (a constant which will be increased over time), then the CA CF can be increased again. This means that if the flow is transmitted at the maximum speed allowed, it will take exactly this time constant (the "increase constant") time to increase the CA Rate. If e.g. the flow is transmitting at half the allowed CA bit rate, it will take two times (2*) the time constant to increase the data rate.

A number which is used is the so called CA Rate utilization, which here is defined as the actual transmission rate of the flow, divided by the maximum sending rate which the latest CA CF allows.

If the amount of received data does not reach this number within a predefined time interval (the "reset constant"), then the utilization of the last sent CA Rate is evaluated, and the data counter is set to zero.

If the CA Rate utilization calculated at the end of said predefined time interval is smaller than a predefined limit (decrease limit), the CA rate is decreased by the flow control mechanism. The reason for this is that the CA bit rate should represent the real bit rate to a high degree, in order to be prepared when congestion is detected, or, in other words, to increase the probability that a CA bit rate reduction has an effect on the detected congestion.

The ratio of the two constants (increase and reset constants) determines a minimum utilization (increase limit) of the CA Rate needed for increasing the CA Rate.

In the following, a more detailed description of the exact mechanism behind the increase and decrease algorithm used by the invention will be given (expressed as a number of sub-algorithms). It should be pointed out that this is merely to facilitate the understanding of the invention, and is not intended to limit the scope of the invention in any way.

Counting Received Data

Whenever a HS-DSCH data frame is successfully received in the RBS 130, a counter (hsRecPduOctets) is increased with the total length of RLC (Radio Link Control) PDUs in the data frame.

Data Rate Increase Algorithm Based on a Time Constant
Input to the Algorithm:
hsRecPduOctets [octets]
lastSentCA [kbps] (Bitrate value in the last sent CA CF)
hsCaIncrMinInterval (The minimum time required to increase the caBitrate again)
Algorithm:

```
IF hsRecPduOctets*8 > lastSentCA* hsCaIncrMinInterval THEN
    Allow rate increase (Enough octets were received)
ELSE
    Deny rate increase (Not enough octets were received)
END IF
```

Explanation:

This algorithm ensures that after increasing the capacity allocation bit rate, at least the time interval hsCaIncrMinInterval must elapse before the capacity Allocation Bit Rate can be increased again.

The algorithm also adds a randomization to the increase, since the CA control frame delays and HS-DSCH data frame delays vary with the transport network conditions, which means that the time when the limit "lastSentCA*hsCaIncrMinInterval" is reached is not deterministic.

The algorithm also ensures that for flows transmitting with lower speed than the one defined by the caBitrate, it will take more time to increase the caBitrate again. As an example, if the user transmits with the speed lastSentCa/2, it will take 2*hsCaIncrMinInterval time to increase the caBitrate again.

CA Utilization Estimation and CA Utilization Congestion Detection

This algorithm estimates CA Utilization (caUtilEstimation), and detects CA Utilization congestion (ca UtilCongestionFlag).

The purpose of this algorithm is to increase the probability that a CA bit rate decrease will take effect directly on the real HS user data, or at least within a few iterations of the flow control. The real HS bit rate should be well represented by the CA bit rate, with some margin for bursty user data traffic.

The algorithm also ensures that the CA bit rate will not be increased if the CA utilization is too low, and that the CA bit rate is not even maintained when the CA utilization is much too low.

This algorithm interacts with the algorithm described under the heading "Counting received data" above by resetting the hsRecPduOctets value from time to time. In this way, it is possible to stop increasing the caBitrate completely.

By setting the caUtilCongestionFlag, the flow control can be influenced to decrease the caBitrate in cases when the Capacity Allocation Utilization is very small.

Data Used by the algorithm:
TAveraging: The length of the averaging interval, where the CA utilization is calculated.
hsRecPduOctets
lastSentCA
recPduResetTimer: a timer which is used.
caUtilIncrLimit, caUtilCaKeepLimit, hsCaIncrMinInterval
Output from the Algorithm
caUtilEstimate, used to judge CA utilization
ca UtilCongestionFlag, indicates a caUtilCongestion
The Algorithm in Pseudo Code
    Procedure: Reset hsRecPduOctets
        hsRecPduOctets=0
    Stop recPduResetTimer (if running)
    Start recPduResetTimer with TAveraging=(1/caUtilIncrLimit)*hsCaIncrMinInterval
    Procedure: recPduResetTimer expires
When the timer expires we can approximate caUtilEstimate as follows:

```
caUtilEstimate = (hsRecPduOctets * 8) / (TAveraging*LastSentCA)
IF caUtilEstimate < caUtilCaKeepLimit
THEN
Set caUtilCongestionFlag
End IF
```

If the timer expires, then caUtilEstimate<caUtilIncrLimit, since we otherwise would have changed CA already, because hsRecPduOctets>lastSentCA*hsCaIncrMinInterval.
Call Procedure "Reset hsRecPduOctets"
When the sent CA Bitrate is changed:
    Call Procedure "Reset hsRecPduOctets"
Procedure: downProhibitTimer expires
    Call Procedure "Reset hsRecPduOctets"
Effect of caUtilConqestionFlag After the caUtilCongestionFlag is set, the flow control algorithm will treat it as any other kind of congestion event: it will reduce the rate allowed for this flow to avoid congestion. In this way, if the Capacity Allocation utilization is small, the CA bit rate will be decreased to allow higher utilization of the Capacity Allocation.

The invention is not limited to the examples of embodiments described above, but may be freely varied within the scope of the appended claims.

The invention claimed is:

1. A method for controlling the flow of traffic in a cellular telephony system including one or more cells, each cell including at least one Radio Base Station (RBS) to control the traffic to and from user equipment (UE) in the cell, wherein the traffic to each UE comprises at least one traffic flow, the method comprising:
   executing a control function for each controlled flow of traffic to each UE, wherein the control function comprises a congestion avoidance function operative to detect a presence or an absence of congestion in a traffic flow to a UE;
   non-linearly reduce a bit rate of the traffic to the congested UE responsive to detecting either congestion or low utilization of the cellular telephony system, wherein congestion is deemed to have been detected if a predetermined type of data frame has not been received by a Radio Network Controller (RNC) from the RBS during a predetermined amount of time;
   linearly increase the bit rate of the traffic to the previously congested UE responsive to detecting the absence of congestion; and
   minimize a time between successive bit rate decreases using a down prohibit function included in the congestion avoidance control function.

2. The method of claim 1 wherein the non-linear reduction is performed either exponentially or as a step function.

3. The method of claim 2 wherein the down prohibit function includes a time period after each bit rate decrease, during which time period new bit rate decreases are disallowed.

4. The method of claim 1 wherein the congestion avoidance function is further operative to non-linearly increase the bit rate of the traffic flow to the UE using a slow start function when a new traffic flow to a UE is established.

5. The method of claim 4 wherein the bit rate of the traffic flow to the UE is non-linearly increased until congestion of the new traffic flow is detected, or until a predefined threshold for the traffic rate is reached.

6. The method of claim 5 wherein the congestion avoidance function is further operative to establish a new traffic flow to a UE using an initialization procedure in which a maximum bit rate for the new traffic flow is established, an initial bit rate for the new traffic flow is established, and a threshold bit rate for the slow start function is established.

7. The method of claim 6 wherein the congestion avoidance function further includes an inactive state following the initialization procedure and before performing the slow start function.

8. The method of claim 1 wherein data sent from the RNC to the RBS is reduced in steps until the RNC receives the predetermined type of data frame.

9. The method of claim 1 wherein the predetermined type of data frame is a Capacity Allocation (CA) frame.

10. The method of claim 1 wherein congestion is deemed to be absent if an amount of data received by the RBS from the RNC exceeds a rate given in a Capacity Allocation Control Frame (CA CF) message sent by the RBS to the RNC multiplied by a predefined constant $C_1$, wherein the CA CF comprises the most recent CA CF sent by the RBS to the RNC.

11. The method of claim 1 wherein low utilization of the cellular telephony system is deemed to occur if an actual data rate received by the RNC divided by a rate defined in a most recent Capacity Allocation Control Frame (CA CF) message sent by the RBS to the RNC does not exceed a predefined limit during a predefined period of time.

12. A Radio Base Station (RBS) for controlling traffic flow to and from user equipment (UE) in a cell of a cellular telephony system, wherein the traffic from the system to each UE comprises at least one traffic flow, and wherein the RBS includes a control function to control the one or more traffic flows to one or more UEs, the RBS comprising:
   a flow control function associated with each controlled traffic flow to each of the UEs, the flow control function comprising a congestion avoidance control function configured to:
      detect a presence or an absence of congestion in a traffic flow to a UE, wherein the congestion avoidance control function is configured to detect congestion if a Radio Network Controller (RNC) does not receive a predefined type of data frame from the RBS during a predetermined amount of time;
      non-linearly reduce a bit rate of the traffic flow to a UE responsive to detecting the presence of congestion or low utilization of the cellular telephone system;
      linearly increase the bit rate of the traffic flow to a previously congested UE responsive to detecting the absence of congestion; and
      wherein the congestion avoidance function includes a down prohibit function that guarantees a minimum time between bit rate decreases.

13. The RBS of claim 12 wherein the congestion avoidance control function is configured to perform the non-linear reduction exponentially or as a step function.

14. The RBS of claim 13 wherein the down prohibit function includes a time period after each bit rate decrease, during which no new bit rate reductions are allowed.

15. The RBS of claim 12 further comprising a slow start function configured to non-linearly increase the bit rate of the traffic flow when a new traffic flow to a given UE is established.

16. The RBS of claim 15 wherein the slow start function is configured to non-linearly increase the bit rate of the traffic flow until congestion is detected or a predefined threshold for the traffic rate is reached.

17. The RBS of claim 16 wherein the congestion avoidance control function is further configured to establish a new flow to a UE by an initialization procedure in which a maximum bit rate for the flow is established, the initial bit rate for the flow is established, and a threshold bit rate for the slow start function.

18. The RBS of claim 17 wherein the congestion avoidance control function is configured to transition into an inactive period between an initialization procedure and the slow start function.

19. The RBS of claim 12 wherein the congestion avoidance control function is configured to reduce the data sent from the RNC to the RBS in steps until the RNC receives the predefined type of data frame.

20. The RBS of claim 12 wherein the predetermined type of data frame is a Capacity Allocation (CA) frame.

21. The RBS of claim 12 wherein the congestion avoidance control function is configured to detect that no congestion is present if an amount of data received by the RBS from a corresponding RNC in the system exceeds the rate given in a Capacity Allocation Control Frame (CA CF) message sent by the RBS to the RNC multiplied by a predefined constant $C1$, wherein the CA CF comprises the most recent CA CF sent by the RBS to the RNC.

22. The RBS of claim 12 wherein the congestion avoidance control function is configured to detect the low utilization of the cellular telephone system if an actual data rate received by the RBS from its RNC divided by the rate defined in a most recent Capacity Allocation Control Frame (CA CF) from the RBS, does not exceed a predefined limit during a predefined period of time.

* * * * *

UNITED STATES PATENT AND TRADEMARK OFFICE
CERTIFICATE OF CORRECTION

PATENT NO. : 9,066,366 B2  
APPLICATION NO. : 12/516237  
DATED : June 23, 2015  
INVENTOR(S) : Nadas et al.

Page 1 of 1

It is certified that error appears in the above-identified patent and that said Letters Patent is hereby corrected as shown below:

On the Title Page, in Item (56), under "OTHER PUBLICATIONS", in Column 2, Line 3, delete "20007," and insert -- 2007, --, therefor.

On Page 2, in Item (56), under "OTHER PUBLICATIONS", in Column 2, Line 2, delete "2055" and insert -- 2005 --, therefor.

On Page 2, in Item (56), under "OTHER PUBLICATIONS", in Column 2, Line 4, delete "2055," and insert -- 2005, --, therefor.

In The Specification

In Column 2, Line 29, delete "applied, and" and insert -- applied, --, therefor.

In Column 2, Line 31, delete "invention, and" and insert -- invention, --, therefor.

In Column 2, Line 34, delete "FIG. 4a-4c" and insert -- FIGS. 4a-4c --, therefor.

In Column 4, Line 58, delete "then flow" and insert -- then the flow --, therefor.

Signed and Sealed this  
Sixteenth Day of August, 2016

Michelle K. Lee  
*Director of the United States Patent and Trademark Office*